(12) United States Patent
Sureka et al.

(10) Patent No.: US 9,307,371 B2
(45) Date of Patent: Apr. 5, 2016

(54) METHOD AND SYSTEM FOR SMS/MMS MESSAGING TO A CONNECTED DEVICE

(75) Inventors: Ashutosh K. Sureka, Irving, TX (US);
Michael J. Naggar, Frisco, TX (US);
Scott A. Evans, Carrollton, TX (US);
Puneet Kalia, Kukkatpally (IN); Wei X. Liu, Flower Mound, TX (US);
Gangadhar Rao Gogineni, Moulali (IN); Rahim Charania, Euless, TX (US); Shuchi R. Patel, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1002 days.

(21) Appl. No.: 12/016,260

(22) Filed: Jan. 18, 2008

(65) Prior Publication Data

US 2009/0186634 A1 Jul. 23, 2009

(51) Int. Cl.
*H04Q 7/20* (2006.01)
*H04W 4/14* (2009.01)

(52) U.S. Cl.
CPC ..................................... *H04W 4/14* (2013.01)

(58) Field of Classification Search
CPC .............. H04Q 7/20; H04B 1/04; G06F 15/16
USPC ............ 455/417, 426, 450, 517, 426.1, 426.2
See application file for complete search history.

(56) References Cited

U.S. PATENT DOCUMENTS

| | | | |
|---|---|---|---|
| 6,424,841 B1 * | 7/2002 | Gustafsson | 455/466 |
| 7,756,256 B1 * | 7/2010 | Rukman et al. | 379/88.13 |
| 7,835,344 B1 * | 11/2010 | Bartholomew et al. | 370/352 |
| 2005/0132060 A1 * | 6/2005 | Mo et al. | 709/227 |
| 2006/0133582 A1 * | 6/2006 | McCulloch | 379/45 |
| 2008/0192736 A1 * | 8/2008 | Jabri et al. | 370/352 |

* cited by examiner

*Primary Examiner* — Myron K Wyche (57) ABSTRACT

The method and system for SMS/MMS messaging to a connected device may be realized as a system comprising at least one server module. The at least one server module may be adapted to receive from a connected device an outbound messaging message through a packet-based network. The at least one server module may also be adapted to send the outbound messaging message to an external messaging network. The connected device may be communicatively coupled to the packet-based network. The outbound messaging message may be associated with a user account. The user account may be associated with a telephone number.

24 Claims, 5 Drawing Sheets

Receive an inbound SMS/MMS message having a recipient telephone number from an external SMS/MMS network, the recipient telephone number associating with a user account
402

Store the inbound SMS/MMS message in an inbox of the user account
404

Forward the inbound SMS/MMS message via a packet-based network to a land-wired network connected device communicatively coupled to the packet-based network
406

End
408

METHOD AND SYSTEM FOR SMS/MMS MESSAGING TO A CONNECTED DEVICE

BACKGROUND INFORMATION

Short Message Service (SMS) is commonly known as text messaging. Multimedia Messaging Service (MMS) is an evolution of SMS that incorporates multimedia content (e.g., images, audio, video) in addition to text. SMS service and/or MMS service may be referred together as SMS/MMS messaging. A message delivered by SMS/MMS messaging may be referred to as a SMS/MMS message or a messaging message. SMS/MMS messaging may be implemented for mobile communication services (e.g., cellular communication services).

Telephony services that depend on land based wires (e.g., circuit-switched landline telephony services), may not provide SMS/MMS messaging. Similarly, Internet based telephony services (e.g., VoIP telephony services), may not provide SMS/MMS messaging. The telephony services that depend on land based wires and/or the Internet may be referred to as land-wired telephony services. Telephony devices connected to the land-wired telephony services may be referred to as land-wired telephony devices.

In addition to land-wired telephony devices, SMS/MMS messaging are not provided to a variety of other network connected digital devices, such as, but not limited to, personal computers (PCs), laptops, portable media players, Digital Video Recorders (DVRs) and game consoles. These devices and the land-wired telephony devices may be referred to as connected devices.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes servers, land-wired telephony devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, telephony devices, etc.) separately. The functions described as being performed at various components may be performed at other components, and the various components may be combined and/or separated. Other modifications also may be made.

Figure 1:
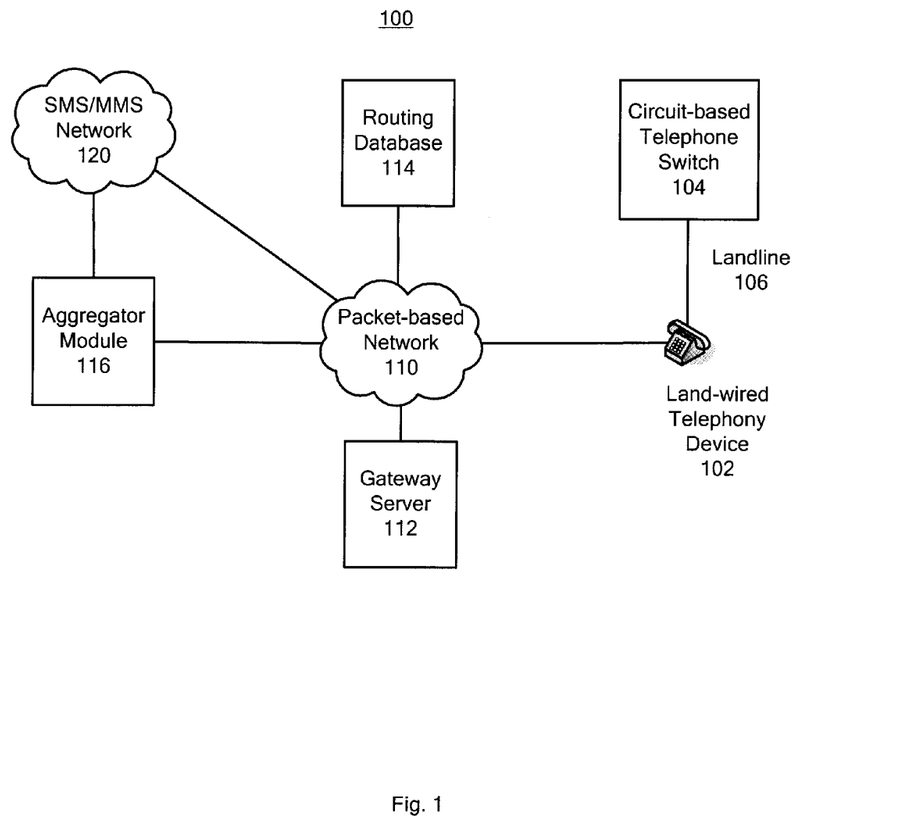
FIG. 1 is a schematic diagram of a system for providing SMS/MMS messaging to a connected device communicatively coupled to a packet-based network in accordance with exemplary embodiments.

FIG. 1 is a schematic diagram of a system for providing SMS/MMS messaging to a connected device communicatively coupled to a packet-based network in accordance with exemplary embodiments. As shown in FIG. 1, in an exemplary embodiment, a system 100 may include a connected device 102, a circuit-based telephone switch 104, a telephone landline 106, a packet-based network 110, a gateway server 112, a routing database 114, an aggregator module 116, and a SMS/MMS network 120. It is noted that system 100 illustrates a simplified view of various components included in a system for implementing SMS/MMS messaging to a connected device, and that other hardware devices and software not depicted may be included in the system 100. It is also noted that the system 100 illustrates only a single instance of each component. It will be appreciated that multiple instances of these components may be used. Moreover, the system 100 may include other devices not depicted in FIG. 1.

The connected device 102 may be a land-wired telephony device and may be referred to as a land-wired telephony device 102. The land-wired telephony device 102 may be communicatively coupled to the telephone landline 106 and may be capable of establishing telephone sessions through the circuit-based telephone switch 104. That is, the land-wired telephony device 102 may be used as a landline based telephone and may have an associated telephone number assigned to the telephone landline 106.

In addition, the land-wired telephony device 102 may have a screen (e.g., to display/play SMS/MMS messages, to provide a touch screen keypad). For example, the land-wired telephony device 102 may be a telephone with a base station and a handset. The base station may run an embedded operating system (e.g., a Montavista Linux, or a Windows CE). The base station may have a touch screen to provide a variety of functions, such as, but not limited to, retrieve, send, display/play, reply, forward, delete SMS/MMS messages. The handset may be connected to the base station by a cord or may be cordless.

Further, the telephony device 102 may be capable of communicating digitized data packets via a packet-based network 110. That is, the land-wired telephony device 102 may have an integrated component to handle data packets, such as, but not limited to, data packets based on Ethernet protocols, or Internet Protocol (IP). For example, the embedded operating system described in the previous example may handle data packets as needed.

The land-wired telephony device 102 may be communicatively coupled to the gateway server 112 via the packet-based network 110. The packet-based network 110 may be, for example, an IP network, or other packet switched networks. The packet-based network 110 may be a wired network, a wireless network (e.g., IEEE 802.11 network), or a combination of wired and wireless networks. The packet-based network 110 may pass digital data between various devices, such as, but not limited to, the land-wired telephony device 102, the gateway server 112, the routing database 114, and the aggregator module 116. The connection between the land-wired telephony device 102 and the packet-based network 110 may be wired (e.g., unshielded twisted pair, fiber optic service), wireless (e.g., IEEE 802.11 network), or a combination of wired and wireless connection.

Figure 2:
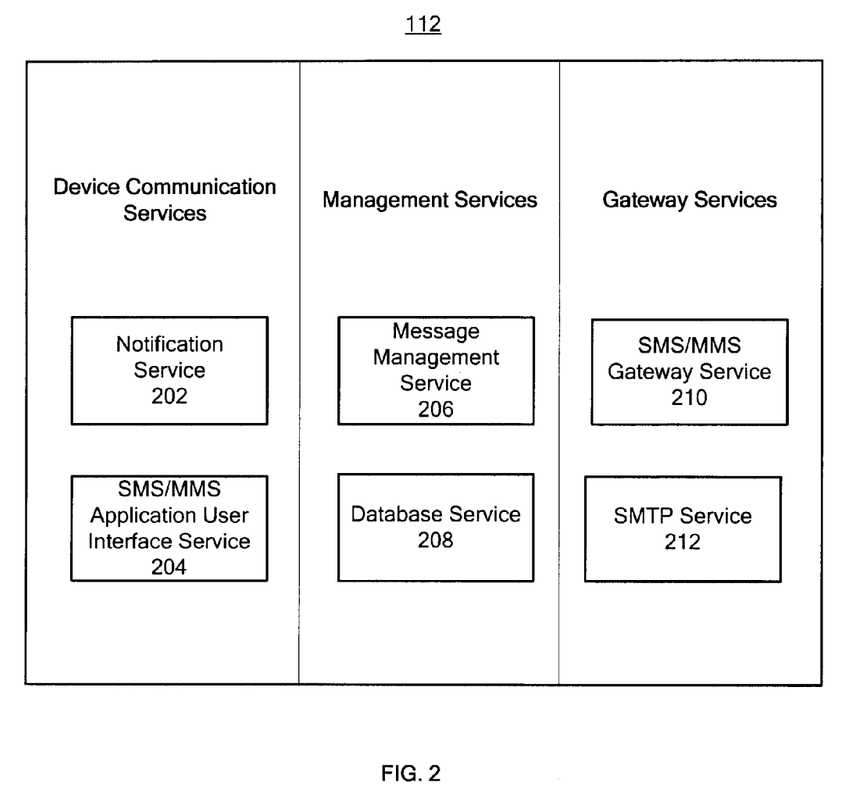
FIG. 2 is a block diagram for a gateway server offering various services in accordance with exemplary embodiments.

The gateway server 112 may provide SMS/MMS messaging to connected devices (e.g., land-wired telephony device 102) that communicatively coupled to the packet-based network 110. The gateway server 112 may manage and store SMS/MMS messages in respective user accounts. User accounts are described in further detail below. The gateway server 112 may be a software application, a piece of hardware or a combination of both software and hardware which may provide SMS/MMS messaging for the land-wired telephony device 102. In an exemplary embodiment, the gateway server 112 may implement a plurality of services as shown in FIG. 2.

In one exemplary embodiment, the gateway server 112 may be connected to the SMS/MMS network 120 directly via the packet-based network 110. Thus, the gateway server 112 may send SMS/MMS messages directly to the SMS/MMS network 120 and receive SMS/MMS messages directly from the SMS/MMS network 120. In another exemplary embodiment, the gateway server 112 may be connected to the SMS/MMS network 120 via an aggregator module 116. The aggregator module 116 may provide a SMS/MMS aggregating service. The SMS/MMS aggregating service is well known in the art. For example, the aggregator module 116 may be a SMS/MMS aggregating service provided by Sybase 365 that connects the gateway server 112 to the SMS/MMS network 120. The aggregator module 116 may be maintained by the service provider maintaining the gateway server 112 or by a third party service provider. The SMS/MMS network 120 and/or the aggregator module 116 may be referred to as external SMS/MMS network.

A SMS/MMS message received from the external SMS/MMS network by the gateway server 112 may be referred to as an inbound SMS/MMS message. The inbound SMS/MMS message may have a recipient telephone number. The recipient telephone number may be a telephone number associated with a user account. Also, a SMS/MMS message submitted to the gateway server 112 by a connected device communicatively coupled to the gateway server 112 via the packet-based network 110 (e.g., the land-wired telephony device 102) may be referred to as an outbound SMS/MMS message. The outbound SMS/MMS message may have one or more recipient telephone numbers. In one exemplary embodiment, another suitable identifier may be used to identify a recipient of an outbound SMS/MMS message (e.g., a short code). In another exemplary embodiment, the recipient of the outbound SMS/MMS message may be identified by a contact identifier from a contact list. The contact list is described in further detail below.

The routing database 114 may be communicatively coupled to the packet-based network 110. The routing database 114 may have routing information for telephone numbers and may be queried for the routing information. For example, when the land-wired telephony device 102 submits an outbound SMS/MMS message to the gateway server 112, the gateway 112 may submit a query to the routing database 114 to determine routing information for a recipient telephone number of the outbound SMS/MMS message before forwarding the outbound SMS/MMS message to the external SMS/MMS network. In another example, when the land-wired telephony device 102 submits an outbound SMS/MMS message to the gateway server 112, the gateway 112 may forward the outbound SMS/MMS message to the aggregator module 116. The aggregator module 116 may submit a query to the routing database 114 to determine routing information for a recipient telephone number of the SMS/MMS message. The routing database 114 may be maintained by a different service provider.

FIG. 2 is a block diagram for a gateway server offering various services in accordance with exemplary embodiments. The gateway server 112 may provide device communication services, management services and gateway services. The device communication services may comprise a notification service 202. The notification service 202 may establish communication sessions with land-wired telephony devices to transmit and/or receive notices. For example, the land-wired telephony device 102 may send a notice to the notification service 202 of the gateway server 112 when the land-wired telephony device 102 establishes a connection to the packet-based network 110 (e.g., powers on, reconnects). The notice may be a start-up registration message. The start-up registration message may comprise an account identifier of a user account. The user account may be associated with a telephone number. The telephone number may be associated with a land based telephone (e.g., land-wired telephony device 102) or a VoIP telephony device. The start-up registration message may further comprise a network communication address (e.g., IP address). In one or more exemplary embodiments, the start-up registration message may further comprise one or more credentials (e.g., a password, a log in key) to establish the communication session.

The notification service 202 may maintain records of a received start-up registration message. For example, upon receiving a start-up registration message from the land-wired telephony device 102, the notification service 202 may store the account identifier and the network communication address of the land-wired telephony device 102 for future uses (e.g., sending a notification for an inbound SMS/MMS message).

The notification service 202 may also send notifications of inbound SMS/MMS messages to the land-wired telephony device 102. For example, after receiving a start-up registration message from the land-wired telephony device 102, the notification service 202 may query the management services to determine whether there are inbound SMS/MMS messages for the land-wired telephony device 102. If there are one or more inbound SMS/MMS messages for the land-wired telephony device 102, the notification service 202 may send notices to the land-wired telephony device 102 about the inbound SMS/MMS messages. In another example, when the gateway server 112 receives an inbound SMS/MMS message for the land-wired telephony device 102, the notification service 202 may send a notice to the land-wired telephony device 102. In response to receiving the notice, the land-wired telephony device 102 may provide an indication of the notice, e.g., an audio signal, a visual signal, or a combination thereof, on the land-wired telephony device 102.

The device communication services of the gateway server 112 may further comprise a SMS/MMS Application User Interface (UI) service 204. The SMS/MMS Application UI service 204 may be a network based server application that in response to receiving requests from the land-wired telephony device 102, transmits requested information back to the land-wired telephony device 102. For example, the SMS/MMS Application UI 204 may be an Internet web application. A user may use the land-wired telephony device 102 to interact with the SMS/MMS Application UI 204 by submitting requests and receiving responses similar to using a web browser to interact with a web application. In one exemplary embodiment, the SMS/MMS Application UI 204 may be implemented similar to a web based email management application, such that a user may interact with the SMS/MMS Application UI 204 to perform functions such as, but not limited to, composing an outbound SMS/MMS message, sending an outbound SMS/MMS message, retrieving an inbound or outbound SMS/MMS message stored on the gateway server 112, or managing SMS/MMS messages (e.g., organizing messages, deleting messages).

For example, when the land-wired telephony device 102 receives a notice about an inbound SMS/MMS message on the gateway server 112, the land-wired telephony device 102 may submit a SMS/MMS message retrieval request to the SMS/MMS Application UI service 204. Upon receiving the SMS/MMS message retrieval request, the SMS/MMS Application UI service 204 may retrieve the inbound SMS/MMS message from the management services of the gateway server 112 and transmit the inbound SMS/MMS message to the land-wired telephony device 102.

In another example, the land-wired telephony device 102 may compose an outbound SMS/MMS message and submit the outbound SMS/MMS message to the SMS/MMS Application UI service 204. The SMS/MMS Application UI service 204 may receive the outbound SMS/MMS message and forward the outbound SMS/MMS message to the management services of the gateway server 112.

The communication between the device communication services of the gateway server 112 and the land-wired telephony device 102 may be based on packet-based communication protocols, such as, but not limited to, Transmission Control Protocol and Internet Protocol (TCP/IP). For example, the notification service 202 may communicate with the land-wired telephony device 102 by TCP sockets. The network communication based on TCP sockets is well known in the art. In another example, the SMS/MMS Application UI service 204 may communicate with the land-wired telephony device 102 by Hypertext Transfer Protocol (HTTP) or secure Hypertext Transfer Protocol (HTTPS). The HTTP and HTTPS are well known in the art.

The management services of the gateway server 112 may comprise a message management service 206 and a database service 208. The message management service 206 may maintain and manage SMS/MMS messages for a plurality of telephone numbers. For each telephone number, the message management service 206 may maintain a corresponding user account in the database service 208. Each user account may be identified by an account identifier, such as, but not limited to, the telephone number, or a custom user identifier (e.g., Joe123). If a user account has a custom user identifier, the corresponding telephone number may be stored in a separate data filed. In one or more exemplary embodiments, each user account may be protected by a password or log in key. In those embodiments, a user using a connected device may need to log in to the gateway server 112 to send and/or receive SMS/MMS messages on the connected device.

For each user account, the message management service 206 may maintain an inbox and an outbox in the database service 208. Therefore, the message management service 206 may deliver an inbound SMS/MMS message to the inbox of a user account associated with a recipient telephone number. The message management service 206 may assign a unique message identifier to each inbound SMS/MMS message.

Similarly, an outbound SMS/MMS message submitted from a connected device may be delivered to an outbox of a user account associated with a telephone number. For example, the land-wired telephony device 102 may send an outbound SMS/MMS message to the gateway server 112. The message management service 206 may copy the outbound SMS/MMS message to the outbox of the user account identified by the account identifier submitted previously by the land-wired telephony device 102 in a start-up registration message. The message management service 206 may assign a unique message identifier to each outbound SMS/MMS message.

The message management service 206 may work with the notification service 202 to provide notifications to the land-wired telephony device 102. For example, as described earlier, when the land-wired telephony device 102 sends a start-up registration message to the notification service 202, the start-up registration message may comprise an account identifier. The notification service 202 may query an inbox of a user account associated with the account identifier for inbound SMS/MMS messages. If there are inbound SMS/MMS messages in the inbox, the notification service 202 may send a notice for each inbound SMS/MMS message respectively. Alternatively, if there are inbound SMS/MMS messages in the inbox, the notification service 202 may send a notice for all inbound SMS/MMS messages.

The message management service 206 may provide access to SMS/MMS messages in the inbox or outbox via the SMS/MMS Application UI service 204 to the land-wired telephony device 102. For example, the SMS/MMS Application UI service 204 may receive a request for an inbound SMS/MMS message. The SMS/MMS Application UI service 204 may submit a query to the message management service 206 for the inbound SMS/MMS message. The message management service 206 may retrieve the inbound SMS/MMS message from the database service 208 and may return the inbound SMS/MMS message to the SMS/MMS Application UI service 204. Similarly, the message management service 206 also may provide user account management via the SMS/MMS Application UI service 204 to the land-wired telephony device 102, such as, but not limited to, delete SMS/MMS messages in the inbox or outbox, create folders in the inbox or outbox, organize SMS/MMS messages in the inbox or outbox into folders.

For each outbound SMS/MMS message, the message management service 206 may provide a preliminary screening to determine whether any recipient telephone numbers of the outbound SMS/MMS message may be associated with user accounts in the message management service 206. If a recipient telephone number is associated with a user account in the message management service 206, the outbound SMS/MMS message is forwarded or copied into the inbox of the user account. By forwarding or copying the outbound SMS/MMS message into the inbox of the user account, the SMS/MMS message becomes an inbound SMS/MMS message for the user account. The message management service 206 may then work with the notification service 202 to provide a notice about the inbound SMS/MMS message to a connected device. The connected device may have established a communication session with the gateway server 112 by submitting a start-up registration message comprising the account identifier of the user account. If the outbound SMS/MMS message has no recipient telephone number associated with a user account in the message management service 206, the outbound SMS/MMS message may be forwarded by the message management service 206 to the SMS/MMS gateway service 210. The SMS/MMS gateway service 210 may deliver the outbound SMS/MMS message to the SMS/MMS network 120 via the aggregator module 116. The SMS/MMS gateway service 210 is described in further detail below.

The message management service 206 may further maintain a contact list for each user account. The contact list may comprise a plurality of personal contacts. Each personal contact may be identified by a contact identifier and may have a corresponding telephone number. Thus, an outbound SMS/MMS message may contain contact identifiers from the contact list instead of recipient telephone numbers when received by the gateway server 112. The gateway server 112 may replace the contact identifiers with a corresponding telephone number from the contact list for each contact identifier in the outbound SMS/MMS message. In addition, when the gateway server 112 receives an inbound SMS/MMS message from the SMS/MMS network 120 (e.g., via the aggregator module 116), the message management service 206 may replace an originating telephone number with a contact identifier if the originating telephone number is associated with a contact identifier in the contact list of the user account. For example, if the user account for the land-wired telephony device 102 has a "Joe" in the contact list, a user using the land-wired telephony device 102 may compose and send an outbound SMS/MMS message to "Joe." The message management service 206 may replace Joe with the recipient telephone number for further delivery. In another example, when a notice about an inbound SMS/MMS message is sent to the land-wired telephone device 102, or an inbound SMS/MMS message is retrieved by the land-wired telephony device 102, the SMS/MMS message may be identified as from "Joe" instead of a telephone number. The contact list may be kept in the database service 208 with the corresponding user account.

The message management service 206 may implement a SMS/MMS message retention policy. For example, an inbox may store for up to a certain number of messages (e.g., 1000 messages). In another example, an inbox may store inbound SMS/MMS messages up to a specified storage limit (e.g., 1 GB). In still another example, an outbox may store outbound SMS/MMS messages for a given time period (e.g., 30 days). Outbound SMS/MMS messages may be deleted from the outbox after the given time period. If the message retention policy is based on storage size or number of messages, the message management service 206 may transmit warning messages via the SMS/MMS Application UI service 204 to a connected device if the inbox or outbox of the user account reaches a certain percentage of the storage size or number of messages, e.g., a threshold. The connected device may be identified by an account identifier sent in a start-up registration message. For example, if the inbox of the user account identified in a start-up registration message sent by the land-wired telephony device 102 reaches the threshold, the message management service 206 may send a warning message via the SMS/MMS Application UI service 204 to the land-wired telephony device 102. Once the size of stored SMS/MMS messages reaches the threshold, the message management service 206 may stop accepting any more inbound SMS/MMS messages for the user account. In another example, if the outbox of the user account identified in a start-up registration message sent by the land-wired telephony device 102 reaches a threshold, the message management service 206 may send a warning message via the SMS/MMS Application UI service 204 to the land-wired telephony device 102. Once the size of stored SMS/MMS messages reaches the threshold, the message management service 206 may stop accepting any more outbound SMS/MMS messages for the user account. The retention policy may be configurable.

The gateway server 112 may further comprise gateway services (e.g., SMS/MMS gateway service 210 and Simple Mail Transfer (SMTP) service 212). The gateway services may provide an interface to communicate with the aggregator module 116. The SMS/MMS gateway service 210 may communicate with the aggregator module 116 to receive inbound SMS messages and/or send outbound SMS messages. For example, the SMS/MMS gateway service 210 may receive an inbound SMS message from the aggregator module 116. The SMS/MMS gateway service 210 may then forward the inbound SMS message to the message management service 206. In another example, the SMS/MMS gateway service 210 may receive an outbound SMS message from the message management service 206 and forward to the aggregator module 116. In one exemplary embodiment, the SMS/MMS gateway service 210 may receive an inbound SMS/MMS message from the SMS/MMS network 120 directly, without the aggregator module 116.

The SMS/MMS gateway service 210 may query a routing database before forwarding an outbound SMS/MMS message to the SMS/MMS network (e.g., the aggregator module 116 and/or the SMS/MMS network 120). For example, the SMS/MMS gateway service 210 may query the routing database 114 using a recipient telephone number. The query result may comprise an address of a second gateway server (e.g., for mobile communication devices, or for land-wired telephony devices) associated with the recipient telephone number. The SMS/MMS gateway service 210 may forward the outbound SMS/MMS message directly to the second gateway server via the SMS/MMS network 120 or forward the outbound SMS/MMS message to the aggregator module 116. The second gateway server may be operated by the same service provider operating the gateway server 112 or by a different service provider. Similarly, the routing database 114 may be operated by the same service provider operating the gateway server 112 or by a different service provider The communication between the SMS/MMS gateway service 210 of the gateway server 112 and the external SMS/MMS network (e.g., the aggregator module 116 and the SMS/MMS network 120) may be based on packet-based communication protocols, such as, but not limited to, TCP/IP. For example, the SMS/MMS gateway service 210 may communicate with the SMS/MMS network using TCP sockets. In another example, the SMS/MMS gateway service 210 may communicate with the aggregator module 116 by Short Message Peer-to-Peer (SMPP) protocol. The SMPP protocol is well known in the art.

The gateway services of gateway server 112 may further comprise a Simple Mail Transfer (SMTP) service 212. The SMTP service 212 may provide a communication channel for the gateway server 112 to exchange MMS messages with the external SMS/MMS network. Thus, inbound and outbound MMS messages may be communicated between the gateway server 112 and the external SMS/MMS network using SMTP protocols. This communication may be achieved by using Multi Media 4 (MM4) protocol. MM4 protocol is an interface specification specified by 3rd Generation Partnership Project (3GPP) and European Telecommunications Standards Institute (ETSI). MM4 protocol specifies the header and body format of a Multipurpose Internet Mail Extension (MIME) message. The MIME message is an email message defined by SMTP. Using MM4 to transmit SMS/MMS messages may be referred to as MM4 over SMTP, which is well known in the art. Using SMTP service 212, the gateway server 112 may receive inbound MMS messages from the SMS/MMS network and transmit outbound MMS messages to the SMS/MMS network via email communication.

The SMTP service 212 may receive outbound MMS messages via the SMS/MMS gateway service 210. For example, the land-wired telephony device 102 may submit an outbound MMS message to the gateway server 112. The message management service 206 may forward the outbound MMS message to the SMS/MMS gateway service 210. The SMS/MMS gateway service 210 may forward the outbound MMS message to the SMTP service 212. The SMTP service 212 may transmit the outbound MMS message to the SMS/MMS network.

The SMTP service 212 may also forward inbound MMS message via the SMS/MMS gateway service 210 to the message management service 206. For example, upon receiving an inbound MMS message, the SMTP service 212 may forward the inbound MMS message to the SMS/MMS gateway service 210. The SMS/MMS gateway service 210 may forward the inbound MMS message to the message management service 206.

In one exemplary embodiment, the services of the gateway server 112 may be performed by corresponding modules respectively. In another exemplary embodiment, each of the services may be combined with any other services in a module, and the gateway server 112 may provide all services by one or more modules. If the services of the gateway server 112 are provided in more than one module, communication between modules may be accomplished using communication mechanism as known in the art, e.g., TCP/IP communication. For example, the notification service 202 may be implemented in a different module from the message management service 206, the notification service 202 and the message management service 206 may communicate by HTTP, which is based on TCP/IP. In another example, the SMS/MMS gateway service 210 may be implemented in a different module from the message management service 206, the SMS/MMS gateway service 210 and the message management service 206 may communicate by Webservices over HTTP as known in the art. In yet another example, the SMS/MMS Application UI service 204 may be implemented in a different module from the message management service 206, the SMS/MMS Application UI service 204 and the message management service 206 may communicate by HTTP.

Figure 3:
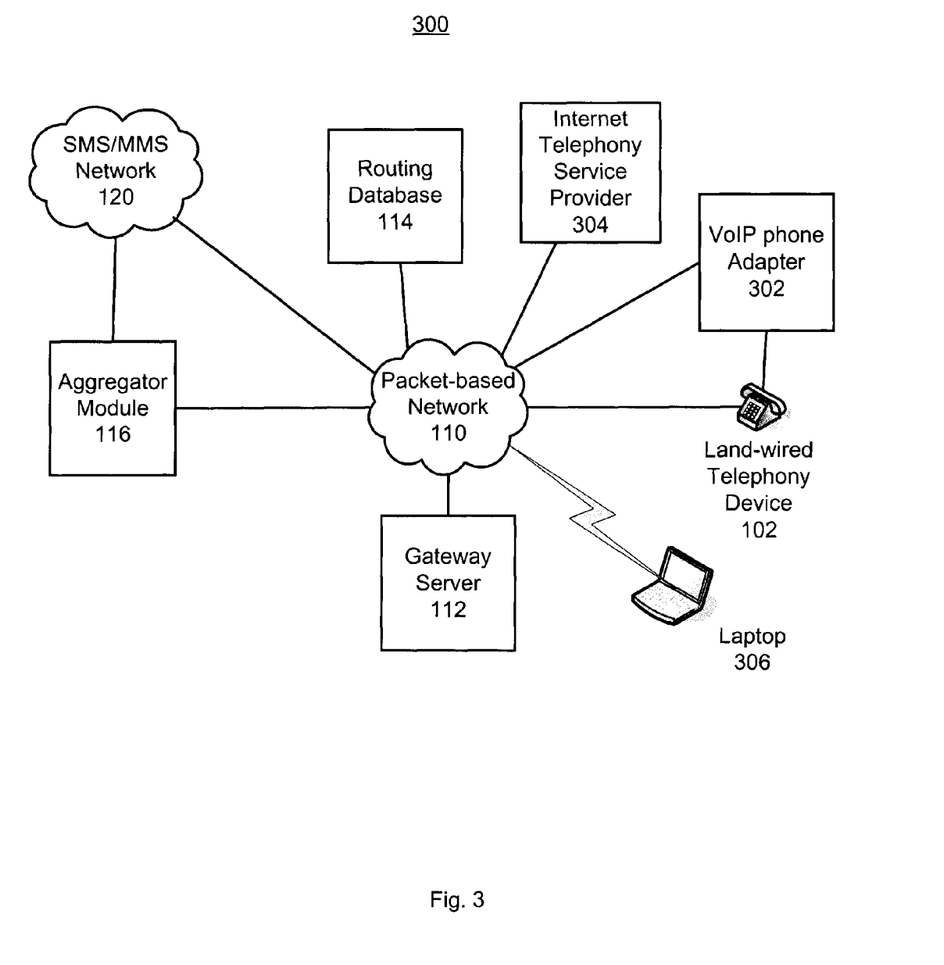
FIG. 3 is a schematic diagram of a system for providing a SMS/MMS messaging to various connected devices in accordance with exemplary embodiments.

FIG. 3 is a schematic diagram of a system for providing a SMS/MMS messaging to an Internet based land-wired telephony device in accordance with exemplary embodiments. As shown in FIG. 3, a system 300 may include a connected device 102, a VoIP phone adapter 302, an Internet telephony service provider 304, a packet-based network 110, a gateway server 112, a routing database 114, an aggregator module 116, and a SMS/MMS network 120. The gateway server 112, the packet-based network 110, the routing database 114, the aggregator module 116 and the SMS/MMS network 120 may function as described previously. It is noted that the system 300 illustrates only a single instance of each component. It will be appreciated that multiple instances of these components may be used. Moreover, the system 300 may include other devices not depicted in FIG. 3.

The connected device 102 may be a land-wired telephony device as shown in FIG. 1. The land-wired telephony device 102 may be communicatively coupled to the packet-based network 110 via the VoIP phone adapter 302. A user may use the VoIP phone adapter 302 to connect the Internet telephony service provider 304 such that the Internet telephony service provider 304 may assign a telephone number to the VoIP phone adapter 302. That is, the land-wired telephony device 102 may be used as a telephone to receive VoIP telephony service. The land-wired telephony device 102 may send a start-up registration message comprising an account identifier to establish a communication session with the gateway server 112. Then the land-wired telephony device 102 may receive and/or send SMS/MMS messages through the gateway server 112. The account identifier comprised in the start-up registration message may identify an account associated with the telephone number on the gateway server 112. In one exemplary embodiment, the land-wired telephony device 102 may have built-in VoIP support. That is, the land-wired telephony device 102 may function as a VoIP phone standalone without the VoIP phone adapter.

It should be noted that the land-wired telephony device 102 is one exemplary connected device that may be used to receive and/or send SMS/MMS messages via the gateway server 112 through the packet-based network 110. Because the user accounts are associated with telephone numbers, any person with a telephone number may have a user account associated with the telephone number on the gateway server 112. For example, a user with a telephone number may ask a service provider maintaining the gateway server 112 to create a user account on the gateway server 112. Once the user account is set up, the user may use a variety of connected devices communicatively coupled to the packet-based network 110 to receive and send SMS/MMS messages via the gateway server 112. The variety of devices may include, such as, but not limited to, a personal computer, a laptop, a portable media player, a Digital Video Recorder (DVR) or a game console.

As shown in FIG. 3, for example, the system 300 may further comprise a connected device 306. The connected device 306 may be a laptop and may be referred to the laptop 306. The laptop 306 may be communicatively coupled to the packet based network by a packet-based network connection, such as, but not limited to, wired Ethernet or wireless Ethernet (e.g., 802.11). A user of the laptop 306 may have a telephone number associated with a land based telephone or a VoIP telephony device. The user may set up a user account on the gateway server 112. The user account may be associated with the telephone number. The user may use the laptop 306 to receive SMS/MMS messages with the telephone number as a recipient telephone number. The user may also send SMS/MMS messages with the telephone number as an originating telephone number using the laptop 306.

In one or more exemplary embodiments, a user may be asked to log in to a user account before the user may use a connected device to receive and/or send SMS/MMS messages. For example, the gateway server 112 may ask a user using the laptop 306 to provide an account identifier and a password in the start-up registration message to establish a communication session.

Figure 4:
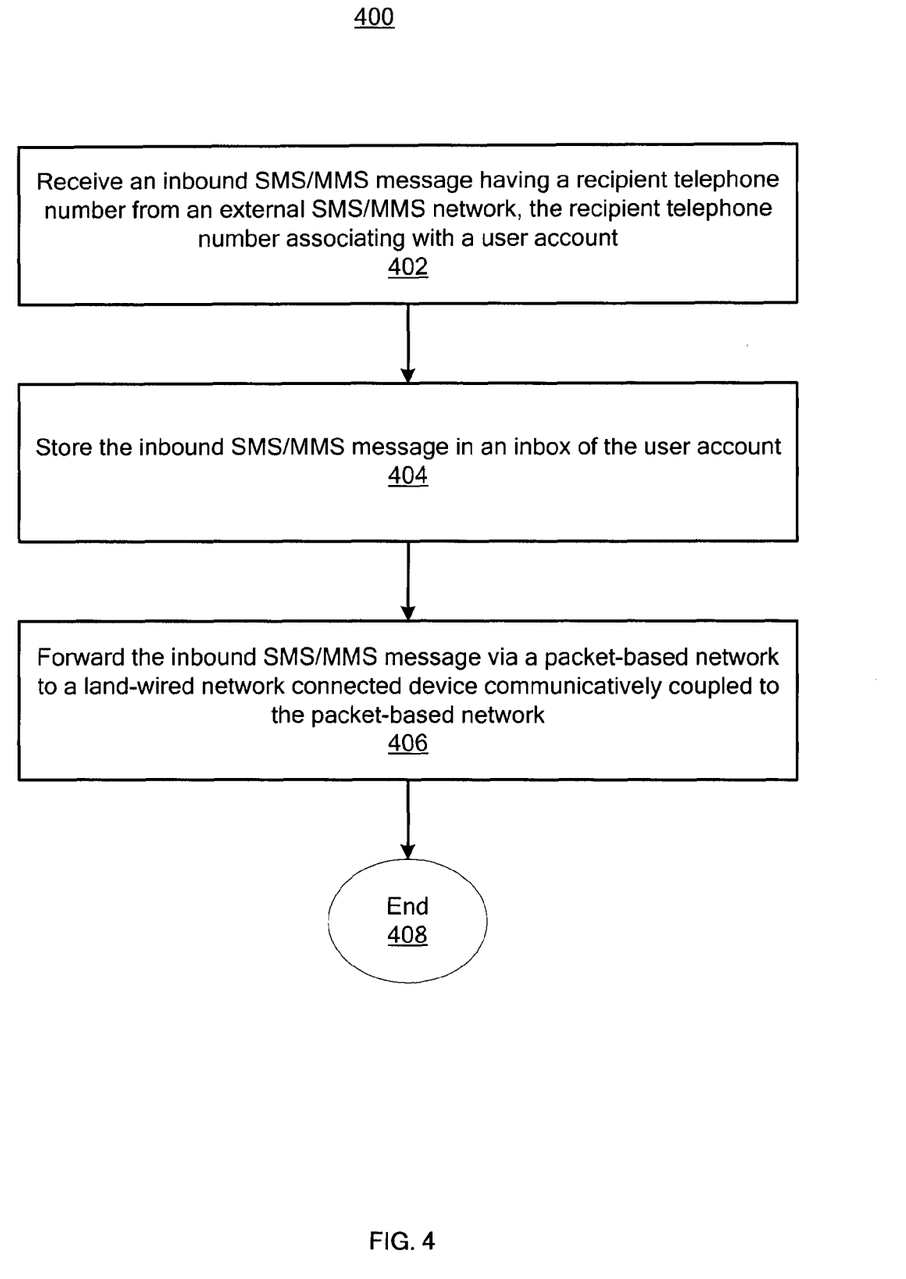
FIG. 4 is a flow diagram of a method for delivering an inbound SMS/MMS message to a connected device in accordance with exemplary embodiments.

FIG. 4 is a flow diagram of a method for delivering an inbound SMS/MMS message to a connected device in accordance with exemplary embodiments. This exemplary method is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods or subroutines carried in the exemplary method 400. Referring to FIG. 4, the exemplary method 400 may begin at block 402.

In block 402, a gateway server 112 may receive an inbound SMS/MMS message from an external SMS/MMS network with the inbound SMS/MMS message having a recipient telephone number associated with a user account. As previously described, the gateway server 112 may comprise a SMS/MMS gateway service 210 and a SMTP service 212. The SMS/MMS gateway service 210 may receive an inbound SMS messages from the external SMS/MMS network (e.g., the aggregator module 116 or the SMS/MMS network 120). The SMTP service 212 may receive inbound MMS messages from the external SMS/MMS network (e.g., the aggregator module 116 or the SMS/MMS network 120). For example, the SMS/MMS gateway service 210 may receive an inbound SMS message using the SMPP protocol. In another example, the SMTP service 212 may receive an inbound MMS message using the MM4 over SMTP protocol. The method 400 may continue to block 404.

In block 404, the gateway server 112 may store the inbound SMS/MMS message in an inbox of the user account. As previously described, the SMS/MMS gateway service 210 may forward the inbound SMS message to the message management service 206 of the gateway server 112. In addition, the SMTP service 212 may forward the inbound MMS message to the SMS/MMS gateway service 210, which in turn may forward the inbound MMS message to the message management service 206 of the gateway server 112. The message management service 206 of the gateway server 112 may store the inbound SMS/MMS message in an inbox of the user account that is associated with the recipient telephone number.

If a SMS/MMS message retention policy is in place, the message management service 206 may determine whether there is enough storage space before storing the inbound SMS/MMS message. For example, there may be a storage size limit of 1 GB for the inbox of the user account. The message management service 206 may determine that there is sufficient storage space and store the received inbound SMS/MMS message. The method 400 may continue to block 406.

In block 406, the gateway server 112 may forward the inbound SMS/MMS message via a packet-based network to a connected device communicatively coupled to the packet-based network. For example, the inbound SMS/MMS message may have a recipient telephone number associated with a user account that may have an account identifier comprised in a start-up registration number sent by the land-wired telephony device 102. After receiving the inbound SMS/MMS message, the message management service 206 may determine the user account associated with the recipient telephone number and forward inbound SMS/MMS message to the land-wired telephony device 102.

The message management service 206 may notify the notification service 202 of the inbound SMS/MMS message. The notification service 202 may determine that there is a communication session established by a start-up message comprising the account identifier. The notification service 202 then may send a notification about the inbound SMS/MMS message to a connected device that established the communication session by sending the start-up message.

In response to the notification of the inbound SMS/MMS message, the connected device may send a request to the gateway server 112 to retrieve the inbound SMS/MMS message. For example, as previously described, the SMS/MMS Application UI service 204 may receive a request to retrieve the inbound SMS/MMS message. The request may be submitted from the land-wired telephony device 102 via the packet-based network 110. HTTP or HTTPS protocol may be used for the transmission of the request. The request may comprise an account identifier. The requested may also comprise a message identifier for the inbound SMS/MMS message. The message identifier may be sent to the connected device by the notification service 202 when notifying the connected device about the inbound SMS/MMS message.

Upon receiving a request to retrieve the inbound SMS/MMS message, the SMS/MMS Application UI service 204 may submit a query to the message management service 206. The query may comprise the account identifier (e.g., submitted by the connected device in the request, or submitted earlier in the start-up registration message) and the message identifier for the inbound SMS/MMS message. The message management service 206 may process the query by querying the inbox of the user account maintained by the database service 208 with the account identifier and the message identifier. The communication between the SMS/MMS Application UI service 204 and the message management service 206 may be HTPP or HTTPS as previously described.

The database service 208 may retrieve the SMS/MMS message identified by the message identifier from the inbox of the user account identified by the account identifier. The database service 208 may return the retrieved SMS/MMS message to the message management service 206. The message management service 206 may then return the SMS/MMS message to the SMS/MMS Application UI service 204. The SMS/MMS Application UI service 204 may send the requested SMS/MMS message to the connected device that made the request. The transmission of the requested SMS/MMS message by the SMS/MMS Application UI service 204 to the connected device may be a HTTP response to a HTTP Get command or HTTP Post command (e.g., a Webservice). The communication may be in HTTPS as previously described. The HTTP response to a HTTP Get command or HTTP Post command are well known in the art. The method 400 may continue to 408 and end.

Figure 5:
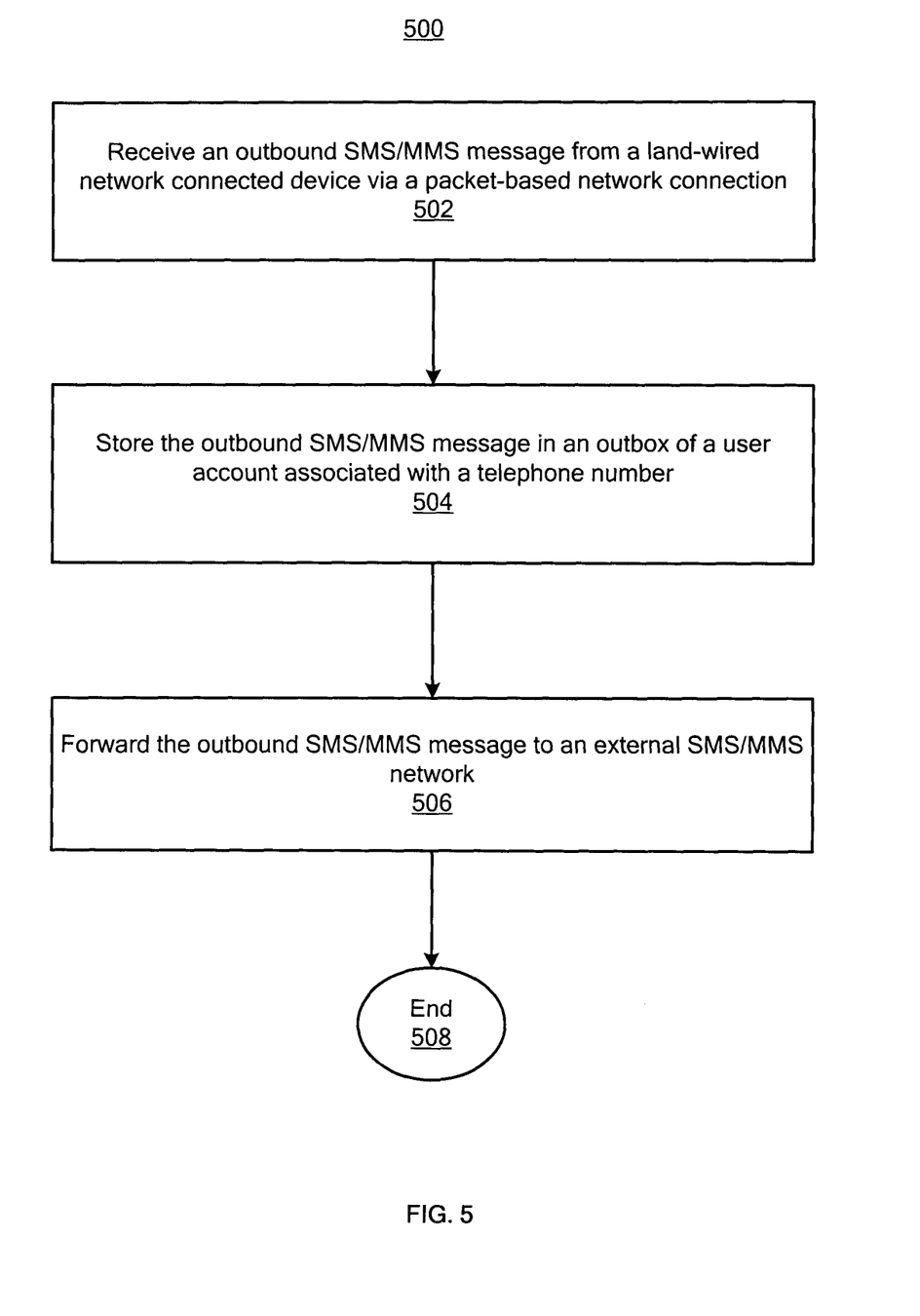
FIG. 5 is a flow diagram of a method for transmitting an outbound SMS/MMS message to a SMS/MMS network in accordance with exemplary embodiments.

FIG. 5 is a flow diagram of a method for transmitting an outbound SMS/MMS message to a SMS/MMS network in accordance with exemplary embodiments. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods or subroutines carried in the exemplary method 500. Referring to FIG. 5, the exemplary method 500 may begin at block 502.

In block 502, the gateway server 112 may receive the outbound SMS/MMS message from a connected device via a packet-based network connection. For example, a user of the land-wired telephony device 102 may compose and submit the outbound SMS/MMS message to the gateway server 112. The SMS/MMS Application UI service 204 of the gateway server 112 may receive the outbound SMS/MMS message. The outbound SMS/MMS message may be submitted by a HTTP Post, which is well known in the art. The submission may comprise an account identifier that may identify a user account on the gateway server 112. The method 500 may continue to block 504.

In block 504, the gateway server 112 may store the outbound SMS/MMS message in an outbox of a user account, the user account may be associated with a telephone number.

Continuing the previous example, the SMS/MMS Application UI service 204 may forward the outbound SMS/MMS message to the message management service 206. The message management service 206 may assign a message identifier for the outbound SMS/MMS message and then store the outbound SMS/MMS message in the outbox of the user account. The user account may be associated with a telephone number. The method 500 may continue to block 506.

In block 506, the gateway server 112 may forward the outbound SMS/MMS message to an external SMS/MMS network. Continuing the previous example, the message management service 206 may attach a telephone number to the outbound SMS/MMS message. The attached telephone number may be the telephone number associated with the user account. Then the message management service 206 may forward the outbound SMS/MMS message to the SMS/MMS gateway service 210. If the outbound SMS/MMS message is a SMS message, the gateway service SMS/MMS gateway service 210 may forward the outbound SMS/MMS message to a SMS/MMS network, such as, but not limited to, the aggregator module 116, or the SMS/MMS network 120. If the outbound SMS/MMS message is a MMS message, the gateway service SMS/MMS gateway service 210 may forward the outbound SMS/MMS message to the SMTP service 212. The SMTP service 212 may forward the outbound SMS/MMS message to the external SMS/MMS network, such as, but not limited to, the aggregator module 116, or the SMS/MMS network 120.

In another exemplary embodiment, the gateway server 112 may submit a query to the routing database 114 to determine how to forward the outbound SMS/MMS message. The SMS/MMS gateway service 210 of the gateway server 112 may submit a query to the routing database 114 with a recipient telephone number. The routing database 114 may return a query result that comprises a network address of a recipient gateway server that may be associated with the recipient telephone number. If the outbound SMS/MMS message is a SMS message, the gateway service SMS/MMS gateway service 210 may forward the outbound SMS/MMS message to the network address of the recipient gateway server. If the outbound SMS/MMS message is a MMS message, the gateway service SMS/MMS gateway service 210 may forward the outbound SMS/MMS message to the SMTP service 212. The SMTP service 212 may forward the outbound SMS/MMS message to the to the network address of the recipient gateway server. The method 500 may continue to 508 and end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system comprising:
 at least one server to:
   receive, from a connected device and via a packet-based network, an outbound messaging message;
   identify a contact identifier in the outbound messaging message;
   replace the contact identifier with a telephone number in the outbound messaging message based on a user account associated with the outbound messaging message;
   query at least one routing database to identify a network address of a recipient gateway associated with the telephone number,
     the recipient gateway being at least one of a Short Message Service (SMS) gateway or a Multimedia Messaging Service (MMS) gateway; and
   send, via an external messaging network, the outbound messaging message to the recipient gateway by using the network address,
     the connected device being communicatively coupled to the packet-based network.

2. The system of claim 1, wherein the connected device is one of a land-based telephony device, a VoIP telephony device, or a network connected digital device.

3. The system of claim 1, wherein the at least one server is further to:
 receive, from the external messaging network, an inbound messaging message; and
 send the inbound messaging message to the connected device through the packet-based network.

4. The system of claim 1, wherein the outbound messaging message is one of a Short Message Service (SMS) message or a Multimedia Messaging Service (MMS) message.

5. The system of claim 1, wherein the at least one server is further to:
 manage the outbound messaging message.

6. The system of claim 1, wherein the at least one server is further to:
 store the outbound messaging message in an outbox of the user account.

7. The system of claim 3, wherein the at least one server is further adapted to:
 manage the inbound messaging message in an inbox.

8. The system of claim 7, wherein the inbox is managed for the user account.

9. The system of claim 8,
 wherein a contact list is maintained for the user account, and
 wherein the contact list includes the contact identifier.

10. The system of claim 1,
 wherein the at least one server comprises a Simple Mail Transfer Protocol (SMTP) server communicatively coupled to the external messaging network, and
 wherein the SMTP server is to:
   receive an inbound messaging message from the external messaging network over a SMTP connection.

11. A system comprising:
 at least one server to:
   receive, from an external messaging network, an inbound messaging message;
   identify an originating telephone number in the inbound messaging message;
   determine that the originating telephone number is associated with a contact identifier in a contact list;
   replace the telephone number with the contact identifier in the inbound messaging message based on determining that the telephone number is associated with the contact identifier;
   send the inbound messaging message to a connected device through a packet-based network,
     the connected device being communicatively coupled to the packet-based network;
   receive, from the connected device, an outbound messaging message through the packet-based network;
   query at least one routing database to identify a network address of a recipient gateway associated with a recipient telephone number, the recipient telephone number being associated with the outbound messaging message, and the recipient gateway being at least one of a Short Message Service (SMS) gateway or a Multimedia Messaging Service (MMS) gateway; and send the outbound messaging message to the external messaging network using the network address.

12. The system of claim 11, wherein the connected device is one of a land-based telephony device, a VoIP telephony device, or a network connected digital device.

13. The system of claim 11, wherein the at least one server is further to:

manage the inbound messaging message in an inbox of a user account.

14. The system of claim 11, wherein the at least one server is further to:

store the outbound messaging message in an outbox of a user account.

15. A method comprising:

receiving, by a first gateway server, an inbound message from an external network;

forwarding, by the first gateway server and via a packet-based network, the inbound message to a connected device communicatively coupled to the packet-based network;

receiving, by the first gateway server and from the connected device, an outbound messaging message via the packet-based network;

identifying, by the first gateway server, a contact identifier in the outbound messaging message;

replacing, by the first gateway server, the contact identifier with a telephone number in the outbound messaging message based on a user account associated with the outbound messaging message;

querying, by the first gateway server, at least one routing database to identify a network address of a second gateway server associated with the telephone number, the second gateway server being at least one of a Short Message Service (SMS) gateway or a Multimedia Messaging Service (MMS) gateway; and sending, by the first gateway server, the outbound messaging message to the external messaging network using the network address.

16. The method of claim 15, wherein the connected device is one of a land-based telephony device, a VoIP telephony device, or a network connected digital device.

17. The method of claim 15, further comprising:

storing the inbound message in an inbox of the user account, wherein forwarding the inbound messaging message comprises:

sending a notice about the inbound message to the connected device;

receiving a request to retrieve the inbound message;

querying the inbox of the user account for the inbound message; and providing the inbound message to the connected device.

18. The method of claim 16, further comprising;

mapping the telephone number to a name in a contact list of the user account, the name being the contact identifier.

19. A non-transitory computer readable medium storing instructions, the instructions comprising:

one or more instructions that, when executed by at least one processor, cause the at least one processor to:

receive an outbound message from a connected device via a packet-based network, the connected device being communicatively coupled to the packet-based network;

identify a contact identifier in the outbound messaging message;

replace the contact identifier with a telephone number in the outbound messaging message based on a user account associated with the outbound messaging message;

query at least one routing database to identify a network address of a recipient gateway associated with the telephone number, the recipient gateway being at least one of a Short Message Service (SMS) gateway or a Multimedia Messaging Service (MMS) gateway; and forward the outbound message to an external network using the network address.

20. The non-transitory computer readable medium of claim 19, wherein the connected device is one of a land-based telephony device, a VoIP telephony device, or a network connected digital device.

21. The non-transitory computer readable medium of claim 19, wherein the contact identifier is a name in a contact list of the user account.

22. A method comprising:

receiving, by a first gateway server, an inbound message from an external network;

identifying, by the first gateway server, an originating telephone number in the inbound message;

determining, by the first gateway server, that the originating telephone number is associated with a contact identifier in a contact list;

replacing, by the first gateway server, the telephone number with the contact identifier in the inbound message based on determining that the telephone number is associated with the contact identifier;

forwarding, by the first gateway server and via a packet-based network, the inbound message to a land-wired network connected device communicatively coupled to the packet-based network;

receiving, by the first gateway server and from the land-wired network connected device, an outbound messaging message via the packet-based network;

querying, by the first gateway server, at least one routing database to identify a network address of a second gateway server based on the outbound messaging message, the second gateway server being at least one of a Short Message Service (SMS) gateway or a Multimedia Messaging Service (MMS) gateway; and sending, by the first gateway server, the outbound messaging message to the external messaging network.

23. The method of claim 22, further comprising:

storing the inbound message in an inbox of a user account, where forwarding the inbound message comprises:

sending a notice about the inbound message to the land-wired network connected device;

receiving, from the land-wired network connected device, a request to retrieve the inbound message;

querying, based on the request, the inbox of the user account for the inbound message; and providing the inbound message to the land-wired network connected device.

24. The method of claim 22, further comprising:
identifying the contact identifier in the outbound messaging message after receiving the outbound messaging message; and
replacing the contact identifier with the telephone number before sending the outbound messaging message.

\* \* \* \* \*